United States Patent
Xing et al.

(10) Patent No.: US 11,814,505 B2
(45) Date of Patent: Nov. 14, 2023

(54) PIPE WITH HIGH ABRASION RESISTANCE

(71) Applicant: SABIC GLOBAL TECHNOLOGIES B.V., Bergen op Zoom (NL)

(72) Inventors: Dongbo Xing, Shanghai (CN); Hongtao Shi, Shanghai (CN); Kai Guo, Shanghai (CN); Xiqiang Liu, Shanghai (CN); Dong Wan, Shanghai (CN); Maria Soliman, Selfkant (DE)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 779 days.

(21) Appl. No.: 16/961,822

(22) PCT Filed: Jan. 15, 2019

(86) PCT No.: PCT/EP2019/050907
§ 371 (c)(1),
(2) Date: Jul. 13, 2020

(87) PCT Pub. No.: WO2019/145191
PCT Pub. Date: Aug. 1, 2019

(65) Prior Publication Data
US 2021/0079203 A1    Mar. 18, 2021

(30) Foreign Application Priority Data
Jan. 25, 2018  (EP) ..................... 18153480

(51) Int. Cl.
*B32B 1/08*  (2006.01)
*C08L 23/14*  (2006.01)
*C08L 23/06*  (2006.01)

(52) U.S. Cl.
CPC .............. *C08L 23/14* (2013.01); *C08L 23/06* (2013.01); *C08L 2203/18* (2013.01); *C08L 2207/062* (2013.01); *C08L 2207/066* (2013.01)

(58) Field of Classification Search
CPC ...... C08L 23/14; C08L 23/06; C08L 2203/18; B32B 1/08
USPC ...................................... 428/36.91
See application file for complete search history.

(56) References Cited

U.S. PATENT DOCUMENTS

| | | | | | |
|---|---|---|---|---|---|
| 4,407,893 | A | * | 10/1983 | Malizio | B05D 7/16 427/195 |
| 8,728,600 | B1 | * | 5/2014 | Hayes | C08J 5/121 428/36.1 |
| 9,488,310 | B2 | * | 11/2016 | Hayes | B32B 15/18 |
| 2009/0107553 | A1 | * | 4/2009 | Hayes | B32B 1/08 428/35.9 |
| 2009/0162591 | A1 | * | 6/2009 | Doshi | B32B 27/08 156/296 |
| 2017/0023157 | A1 | * | 1/2017 | Hayes | B32B 27/32 |
| 2020/0354551 | A1 | * | 11/2020 | Masumura | B29C 48/21 |

FOREIGN PATENT DOCUMENTS

| | | |
|---|---|---|
| JP | 2002364783 A | 12/2002 |
| WO | 2007003530 A1 | 1/2007 |
| WO | 2010051419 A1 | 5/2010 |
| WO | 2010051443 A1 | 5/2010 |
| WO | 2015165771 A1 | 11/2015 |

OTHER PUBLICATIONS

Alt et al., "Bimodal Polyethylene—Interplay of Catalyst and Process," Macromol. Symp. 2001, vol. 163, pp. 135-143.
International Search Report for International Application No. PCT/EP2019/050907, International Filing Date Jan. 15, 2019, dated Apr. 26, 2019, 6 pages.
PE 100 Pipe Systems, second edition, Heiner Bromstrup (editor), 2004, pp. 35-42; ISBN 3-8027-2728-2.
PE 100 Pipe Systems, second edition, Heiner Bromstrup (editor), 2004, pp. 16-20 ISBN 3-8027-2728-2.
PE 100 Pipe Systems, second edition, Heiner Bromstrup (editor), 2004, pp. 51-62 ISBN 3-8027-2728-2.
Peacock, Andrew J., "Handbook of Polyethylene", Chapter 3 Production Processes, 2000, Marcel Dekker, Inc., New York; ISBN 0824795466; p. 43-66.
Written Opinion for International Application No. PCT/EP2019/050907, International Filing Date Jan. 15, 2019, dated Apr. 26, 2019, 5 pages.

* cited by examiner

*Primary Examiner* — Margaret G Moore
(74) *Attorney, Agent, or Firm* — CANTOR COLBURN LLP

(57) ABSTRACT

A pipe- or tube-shaped article having an innermost layer, wherein the innermost layer has a thickness of 0.001 to 100 mm and comprises a polyolefin composition comprising a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm3 as determined by ASTM D1505 and b) an olefin polymer selected from high-density polyethylene (HDPE), linear low density polyethylene (LLDPE), polypropylene (PP) and combinations thereof.

15 Claims, No Drawings

PIPE WITH HIGH ABRASION RESISTANCE

CROSS REFERENCE TO RELATED APPLICATIONS

This application is a National Stage application of PCT/EP2019/050907, filed Jan. 15, 2019, which claims the benefit of European Application No. 18153480.1, filed Jan. 25, 2018, both of which are incorporated by reference in their entirety herein.

The present invention relates to a pipe- or tube-shaped article.

Mining application requires pipes having good abrasion wear resistance and heat resistance to slurry solutions. Known pipes are made of steel, ceramics and UHMWPE. These pipes are expensive, heavy and complicated to produce and handle. Alternative pipe solutions are made of HDPE. However, these have to be periodically replaced since their abrasion resistance is poor.

It is an objective of the present invention to provide a pipe or tube-shaped article wherein the above-mentioned problems are solved. In particular, the objective is to provide a tube-shaped article with a very good abrasion resistance.

Accordingly, the present invention relates to a pipe- or tube-shaped article having an innermost layer, wherein the innermost layer has a thickness of 0.001 to 100 mm and comprises a polyolefin composition comprising a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and b) an olefin polymer selected from high-density polyethylene (HDPE), linear low density polyethylene (LLDPE), polypropylene (PP) and combinations thereof.

It was found that the composition of the innermost layer has a very good abrasion resistance and a high Vicat temperature and therefore the innermost layer of the article of the present invention has a very good heat and anti-abrasion resistance. This significantly improves the lifetime of the pipe. The innermost layer also has good compatibility with polyolefins, which is often used as the outer layer of the pipe.

a) Propylene-Ethylene Copolymer a)

The amount of repeat units derived from propylene in the propylene-ethylene copolymer a) may be 80 to 99 wt % based on the weight of the copolymer.

The amount of repeat units derived from ethylene in the propylene-ethylene copolymer may be 1 to 20 wt %, for example at least 3 wt %, at least 5 wt %, at least 10 wt % or at least 15 wt % and/or at most 19 wt % or at most 18 wt %, based on the weight of the copolymer.

Preferably, the amount of repeat units derived from ethylene in the propylene-ethylene copolymer may be 3 to 18 wt %. More preferably, the amount of repeat units derived from ethylene in the propylene-ethylene copolymer may be 10 to 18 wt %.

The propylene-ethylene copolymer a) may have a density in the range from ≥0.80 g/cm$^3$ to ≤90 g/cm$^3$, preferably in the range from 0.85 g/cm$^3$ to 0.89 g/cm$^3$, as determined by ASTM D1505.

The propylene-ethylene copolymer a) may have a MFI of at least ≥1.2 g/10 min and at most ≤21 g/10 min, preferably at most ≤15 g/10 min, preferably at most ≤10 g/10 min, preferably at most ≤5 g/10 min as determined according to D1238 at 190° C. and a load of 2.16 kg.

Suitable examples of the propylene-ethylene copolymer a) include commercial products such as Vistamaxx™ 6102 available from ExxonMobil.

The amount of the propylene-ethylene copolymer a) may be in the range from ≥40 to ≤90 wt %, preferably from 50 to 90 wt % based on the total amount of the propylene-ethylene copolymer a) and the olefin polymer b)

b) Olefin Polymer b)

The olefin polymer is one or a combination of HDPE, LLDPE and/or PP.

The amount of the olefin polymer b) may be 5 to 60 wt % of the total composition.

Preferably, the amount of the olefin polymer b) may be 10 to 50 wt % of the total composition.

Preferably, the amount of the olefin polymer b) may be 20 to 40 wt % of the total composition.

When the ethylene polymer is a combination of HDPE and LDPE, the amount of the HDPE with respect to the ethylene polymer may be 1 to 99 wt %, for example 5 to 95 wt %, 10 to 90 wt %, 20 to 80 wt %, 30 to 70 wt %, 40 to 60 wt % or 45 to 55 wt %.

When the ethylene polymer is a combination of HDPE and LLDPE, the amount of the HDPE with respect to the ethylene polymer may be 1 to 99 wt %, for example 5 to 95 wt %, 10 to 90 wt %, 20 to 80 wt %, 30 to 70 wt %, 40 to 60 wt % or 45 to 55 wt %.

When the ethylene polymer is a combination of LDPE and LLDPE, the amount of the LDPE with respect to the ethylene polymer may be 1 to 99 wt %, for example 5 to 95 wt %, 10 to 90 wt %, 20 to 80 wt %, 30 to 70 wt %, 40 to 60 wt % or 45 to 55 wt %.

When the ethylene polymer is a combination of HDPE, LDPE and LLDPE, the amount of the HDPE with respect to the ethylene polymer may be 1 to 99 wt %, for example 5 to 95 wt %, 10 to 90 wt %, 20 to 80 wt %, 30 to 70 wt %, 40 to 60 wt % or 45 to 55 wt % and/or the amount of the LDPE with respect to the ethylene polymer may be 1 to 99 wt %, for example 5 to 95 wt %, 10 to 90 wt %, 20 to 80 wt %, 30 to 70 wt %, 40 to 60 wt % or 45 to 55 wt % and/or the amount of the LLDPE with respect to the ethylene polymer may be 1 to 99 wt %, for example 5 to 95 wt %, 10 to 90 wt %, 20 to 80 wt %, 30 to 70 wt %, 40 to 60 wt % or 45 to 55 wt %.

In some preferred embodiments, the ethylene polymer is a combination of HDPE and LLDPE, wherein the amount of the HDPE is 10 to 20 wt % of the total composition and the amount of the LLDPE is 10 to 20 wt % of the total composition.

The production processes of HDPE, LLDPE and LDPE are summarised in Handbook of Polyethylene by Andrew Peacock (2000; Dekker; ISBN 0824795466) at pages 43-66.

HDPE

HDPE may be an ethylene homopolymer or may comprise a comonomer, for example butene or hexene.

The HDPE may have a density of 0.940 to 0.970 g/cm$^3$, more preferably 0.940 to 0.955 g/cm$^3$, measured according to ISO 1183.

Preferably, the HDPE has a melt flow rate of 0.03 to 40 g/10 min, more preferably 0.1 to 10 g/10 min, more preferably from 0.1 to 5.0 g/10 min, measured according to ISO1133 (190° C./21.6 kg).

Preferably, HDPE may have a density of 0.940 to 0.960 g/cm$^3$ and a MFR of 1 to 5 g/10 min.

The HDPE may be unimodal, bimodal or multimodal. Preferably, the HDPE is bimodal or multimodal. Such HDPEs may have properties suitable for producing a pipe.

It is understood that a bimodal HDPE has a molecular weight distribution having two peaks corresponding to the first median and the second median of the respective stages in the polymerization. It is similarly understood that a multimodal HDPE has a molecular weight distribution having multiple peaks corresponding to the first median, the second median and one or more further medians of the respective stages in the polymerization.

The HDPE can be produced by using low pressure polymerisation processes. For example, pipe materials of the performance class PE 80 and PE 100 are known, which are generally produced in cascade plants by a so called bimodal or multimodal process. The production processes for bimodal HDPE are summarised at pages 16-20 of "PE 100 Pipe systems" (edited by Bromstrup; second edition, ISBN 3-8027-2728-2). Suitable low pressure processes are slurry cascade of stirred reactors, slurry cascade of loop reactors and a combination of different processes such as slurry loop gas phase reactor. It is also possible to use a multimodal polyethylene, preferably trimodal polyethylene, as described for example in WO2007003530, as high density polyethylene pipe material.

The performance classes PE 80 and PE 100 are discussed at pages 35-42 of "PE 100 Pipe systems" (edited by Bromstrup; second edition, ISBN 3-8027-2728-2). The quality test methods are described at pages 51-62 of "PE 100 Pipe systems".

The production of bimodal high density polyethylene (HDPE) via a low pressure slurry process is described by Alt et al. in "Bimodal polyethylene-Interplay of catalyst and process" (Macromol. Symp. 2001, 163, 135-143). In a two stage cascade process the reactors may be fed continuously with a mixture of monomers, hydrogen, catalyst/co-catalyst and hexane recycled from the process. In the reactors, polymerisation of ethylene occurs as an exothermic reaction at pressures in the range between for example 0.5 MPa (5 bar) and 1 MPa (10 bar) and at temperatures in the range between for example 75° C. and 85° C. The heat from the polymerisation reaction is removed by means of cooling water. The characteristics of the polyethylene are determined amongst others by the catalyst system and by the applied concentrations of catalyst, co monomer and hydrogen.

The concept of the two stage cascade process is elucidated at pages 137-138 by Alt et al. "Bimodal polyethylene-Interplay of catalyst and process" (Macromol. Symp. 2001, 163). The reactors are set up in cascade with different conditions in each reactor including low hydrogen content in the second reactor. This allows for the production of HDPE with a bimodal molecular mass distribution and defined co monomer content in the polyethylene chains.

Preferred examples of the HDPE include a unimodal or bimodal PE 80, a bimodal PE 100 and a multimodal HDPE resin. PE 80 is a PE material with an MRS (minimum required strength after 50 years for water at 20 degrees Celsius) of 8 MPa and PE 100 is a PE material with an MRS of 10 MPa. The pipe classification is elucidated at page 35 of "PE 100 Pipe systems" (edited by Bromstrup; second edition, ISBN 3-8027-2728-2).

LLDPE

The technologies suitable for the LLDPE manufacture include gas-phase fluidized-bed polymerization, polymerization in solution, polymerization in a polymer melt under very high ethylene pressure, and slurry polymerization.

The LLDPE comprises ethylene and a C3-C10 alpha-olefin comonomer (ethylene-alpha olefin copolymer). Suitable alpha-olefin comonomers include 1-butene, 1-hexene, 4-methyl pentene and 1-octene. The preferred co monomer is 1-hexene. Preferably, the alpha-olefin comonomer is present in an amount of about 5 to about 20 wt % of the ethylene-alpha olefin copolymer, more preferably an amount of from about 7 to about 15 wt % of the ethylene-alpha olefin copolymer.

The LLDPE may have a density of 0.900 to 0.948 g/cm3, more preferably 0.915 to 0.935 g/cm3, more preferably 0.920 to 0.935 g/cm3, determined according to ASTM D1505.

The LLDPE may have a flow rate of 0.03 to 30 g/10 min, more preferably 0.3-3.0 g/10 min, determined according to ASTM D1238 (190° C./2.16 kg).

Polypropylene

Propylene may be a homopolymer or a propylene copolymer or a heterophasic propylene copolymer. The PP may have a melt flow rate of 0.01 to 200 g/10 min measured according to ASTM D1238 at 230° C. and a load of 2.16 kg). Preferably, the PP may have a melt flow rate of 0.01 to 5 g/10 min measured according to ASTM D1238 at 230° C. and a load of 2.16 kg). More preferably, the PP may have a melt flow rate of 0.2 to 5 g/10 min measured according to ASTM D1238 at 230° C. and a load of 2.16 kg). Most preferably, the PP may have a melt flow rate of 0.2 to 1 g/10 min measured according to ASTM D1238 at 230° C. and a load of 2.16 kg).

Polypropylene compositions consisting of a propylene homopolymer or a propylene copolymer are known. A propylene homopolymer is obtained by polymerizing propylene under suitable polymerization conditions. A propylene copolymer is obtained by copolymerizing propylene and one or more other olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

Polypropylene and a copolymer of propylene can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Preferably, the copolymer of propylene may be an α-olefin, for example an α-olefin chosen from the group of α-olefin having 2 or 4 to 10 C-atoms, for example wherein the amount of α-olefin is less than 10 wt % based on the total propylene copolymer.

In the composition of the invention, the degree of crystallinity of the polypropylene may be at least 35%, for example at least 40% and for example at most 80%, for example at most 75% as determined using differential dcanning calorimetry according to ASTM D 3418-08 using a scan rate of 10° C./min on a sample of 10 mg and using the second heating cycle. Preferably, the degree of crystallinity of the polypropylene may be in the range from 30 to 55%, more preferably in the range from 35 to 50%.

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratio.

The heterophasic propylene copolymer of the composition of the invention consists of a propylene-based matrix and a dispersed ethylene-α-olefin copolymer.

The propylene-based matrix typically forms the continuous phase in the heterophasic propylene copolymer.

The propylene-based matrix consists of a propylene homopolymer and/or a propylene-α-olefin copolymer consisting of at least 70% by mass of propylene and up to 30% by mass of α-olefin, for example ethylene, for example consisting of at least 80% by mass of propylene and up to 20% by mass of α-olefin, for example consisting of at least 90% by mass of propylene and up to 10% by mass of α-olefin, based on the total mass of the propylene-based matrix.

Preferably, the α-olefin in the propylene-α-olefin copolymer is selected from the group of α-olefins having 2 or 4-10 carbon atoms and is preferably ethylene.

Preferably, the propylene-based matrix consists of a propylene homopolymer.

The melt flow index (MFI) of the propylene-based matrix (before it is mixed into the composition of the invention) may be in the range of for example 0.01 to 200 g/10 min, for example from 0.01 to 80 g/10 min measured according to ISO1133 (2.16 kg/230° C.), for example in the range from 0.01 to 20 g/10 min.

The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.1 to 10 microns, as may be determined by transmission electron microscopy (TEM).

The MFI of the dispersed ethylene α-olefin copolymer (before it is mixed into the composition of the invention) may for example be in the range from 0.001 to 10 g/10 min (measured according to ISO1133 (2.16 kg/230° C.)), preferably in the range from 0.006 to 5 g/10 min.

The dispersed ethylene-α-olefin copolymer is present in an amount of 40 to 5 wt %, for example in an amount of 35 to 15 wt % based on the total heterophasic propylene copolymer, for example in an amount of at least 20 wt % and/or for example in an amount of at most 30 wt % based on the total heterophasic propylene copolymer.

Preferably, the amount of ethylene in the ethylene-α-olefin copolymer is in the range of 20-65 wt %, for example in the range of 40 to 60 wt % based on the ethylene-α-olefin copolymer, for example the amount of ethylene in the ethylene-α-olefin copolymer is at least 30 wt % and/or for example at most 55 wt % based on the ethylene-α-olefin copolymer.

In the heterophasic polypropylene in the composition of the invention, the sum of the total weight of the propylene-based matrix and the total weight of the dispersed ethylene-α-olefin copolymer is 100 wt %

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

c) Optional Components

Preferably, the total weight of the propylene-ethylene copolymer a) and the ethylene copolymer b) is at least 90 wt %, at least 95 wt %, at least 98 wt %, at least 99 wt % or 100 wt % of the total composition.

LDPE

The LDPE may be produced by use of autoclave high pressure technology or by tubular reactor technology.

LDPE may be an ethylene homopolymer or may comprise a comonomer, for example dienes.

Preferably, the LDPE has a density of 0.916 to 940 g/cm$^3$, more preferably 0.920 to 0.935 g/cm$^3$, measured according to ASTM D1505-10.

Preferably, the LDPE has a Melt flow rate of 0.03 to 60 g/10 min, more preferably 0.3-3.0 g/10 min, determined according to ASTM D1238 (190° C./2.16 kg).

The composition according to the invention may further comprise optional components different from the previously mentioned components a) and b) of the composition, such as additives, wherein the total of these components (the previously mentioned components of the composition and the optional components) is 100 wt % of the total composition. Accordingly, the invention relates to a composition consisting of these components a), b) and c).

The additives may include nucleating agents, stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene.

The skilled person can readily select any suitable combination of additives and additive amounts without undue experimentation. The amount of the additives depends on their type and function and typically is of from 0 to about 10 wt %. The amount of the additives may e.g. be from about 0.1 to about 5 wt % based on the total composition.

Polyolefin Composition

The polyolefin composition comprising a propylene-ethylene copolymer and an olefin polymer which may be selected from high-density polyethylene (HDPE), linear low density polyethylene (LLDPE), polypropylene (PP) and combinations thereof, may have a tensile stress of at least 10 MPa and/or the elongation at break is at least 430% as measured according to ASTM D638.

The polyolefin composition according to the invention may have an abrasion weight loss which is at least less than 2%, at least less than 1%, at least less than 0.8%. The abrasion weight loss is measured according to ISO15527:2007. For testing round samples with a hole inside and with the dimensions of 4 mm thickness*30 mm outer diameter*8 mm inner diameter are prepared. The tests are performed on a Zhangjiakou Xuanhuakehua testing machine co. ltd., MSH type. The sample plate is rotated at 673 r/min for 7 h. After the test, the samples are cleaned by water and ultrasonic for 30 min, then the sample are dried at 50° C. for 4 h. The weight of the samples before and after testing are recorded. The weight loss percentage provided is calculated by the formula Abrasion weight loss=(Sample weight before test−Sample weight after test)/Sample weight before test)*100%.

The polyolefin composition according to the invention may have a Vicat temperature of at least 40° C., preferably at least 44° C. as measured according to ASTM D1525 (10N/50 C/hrs).

Article

The present invention provides a pipe- or tube-shaped article having an innermost layer comprising the polyolefin composition described herein. The terms "pipe" and "tube" are herein understood as a hollow elongated article. The cross section may be of various shapes e.g. be circular, elliptical, square, rectangular or triangular.

The article according to the invention, may have an outer diameter in the range of 2.5 to 255 cm and/or an inner diameter of 2 to 250 cm and/or the article may have one or more layers with a total layer thickness in the range of 0.3 to 100 mm. The outer layer may e.g. have a thickness of 0.3 to 50 mm, 1 to 30 mm or 5 to 20 mm.

Preferably, the article according to the invention is a multilayer pipe.

One of the outer layers may be steel, ceramic or polymer.

Suitable examples of the polymer in one of the outer layers include poly(meth)acrylics, polyacrylates, urethane modified polyacrylics, polyester modified polyacrylics, polystyrenes, polyolefins, polyethylenes (such as high density polyethylene, low density polyethylene, linear low density polyethylene, ultralow density polyethylene), polypropylenes, polyurethanes, polyureas, epoxy resins, polyesters (such as poly(ethylene terephthalate), poly(1,3-propyl terephthalate), poly(1,4-butylene terephthalate), PETG, poly(ethylene-co-1,4-cyclohexanedimethanol terephthalate)), alkyd resins, polyamides (such as nylons, nylon 6, nylon 46, nylon 66, nylon 612), polyamideimides, polyvinyls, phenoxy resins, amino resins, melamines, chlorine-containing resins, chlorinated polyethers, fluorine-containing resins, polyvinyl acetals, polyvinyl formals, poly(vinyl butyrate)s, polyacetylenes, polyethers, silicone resins, ABS resins, polysulfones, polyamine sulfones, polyether sulfones, polyphenylene sulfones, polyvinyl chlorides, polyvinylidene chlorides, polyvinyl acetates, polyvinyl alcohols, polyvinyl carbazoles, butyrals, polyphenylene oxides, polypyrroles, polyparaphenylenes, ultraviolet-curing resins, cellulose derivatives, diethylene glycol bis-allyl carbonate poly-4-methylpentene, polytetrafluoroethylene, polytrifluoroethylene, polyvinylidene fluoride, poly(ethylene-co-glycidylmethacrylate), poly(ethylene-co-methyl (meth)acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), acid copolymers, acid terpolymers, poly(ethylene-co-(meth)acrylic acid), ionomers, ionomer terpolymers, metal salts of poly(ethylene-co-(meth)acrylic acid), poly((meth)acrylates), poly(ethylene-co-carbon monoxide), poly(ethylene-co-vinyl acetate), poly(ethylene-co-vinyl alcohol), polybutylene, poly(cyclic olefins), syndiotactic polystyrene, poly(4-hydroxystyrene), novalacs, poly(cresols), polycarbonates, poly(bisphenol A carbonate), polysulfides, poly(phenylene sulfide), poly(2,6-dimethylphenylene oxide), elastomers, rubbers, thermoplastic elastomers and the like and copolymers thereof and mixtures thereof.

More preferably, the polymer in the outer layer is selected from the group consisting of rubbers, elastomers, thermoplastic elastomers, acid terpolymers, ionomer terpolymers and the like and combinations thereof. Rubbers and elastomers are generally categorized as diene elastomers, saturated elastomers, thermoplastic elastomers and inorganic elastomers. Specific examples of rubbers and elastomers include natural rubber, polyisoprene, butyl rubber (copolymer of isobutylene and isoprene), polybutadiene, styrene butadiene (SBR, copolymer of polystyrene and polybutadiene), nitrile rubber (copolymer of polybutadiene and acrylonitrile, also referred to as "buna N rubbers"), silicone RTV, FKM VITON (DuPont) (copolymer of vinylidene fluoride and hexafluoropropylene), SANTOPRENE (Advanced Elastomer Systems, LP, Akron, Ohio), fluorosilicone rubber, EPM and EPDM rubber (ethylene propylene rubber, a copolymer of polyethylene and polypropylene), polyurethane rubber, polyurea rubber, resilin, polyacrylic rubber (ABR), epichlorohydrin rubber (ECO), polysulfide rubber, chlorosulfonated polyethylene (CSM, HYPALON (DuPont)) and the like. Thermoplastic elastomers are generally categorized as styrenics (S-TPE), copolyesters (COPE), polyurethanes (TPU), polyamides (PEBA), polyolefin blends (TPO), polyolefin alloys (TPV), reactor TPO (R-TPO), polyolefin plastomers (POP), polyolefin elastomers (POE) and the like. Acid terpolymers are made from α-olefins, a, beta-ethylenically unsaturated carboxylic acids and preferably about 10 to about 25 wt percent other unsaturated comonomers (all as described above).

Particularly preferably, the outer layer or layers may comprise polypropylene or polyethylene.

The article according to the invention may particularly preferably comprise a layer comprising a polyolefin and the layer is adjacent to the innermost layer.

Preferably, the article may comprise a layer comprising a high density polyethylene and the layer is adjacent to the innermost layer.

The outer layer may further comprise reinforcing fibers.

In some embodiments, the article according to the invention may comprise an outer layer and a tie layer between the innermost layer and the adjacent layer. The tie layer may be comprise anhydride- or acid-grafted materials. The preferred anhydrides and acids are α,β-ethylenically unsaturated carboxylic acid comonomers selected from the group consisting of acrylic acid, methacrylic acid, itaconic acid, maleic acid, maleic anhydride, fumaric acid, monomethyl maleic acid, and mixtures thereof. Most preferred anhydrides and acids are selected from the group consisting of acrylic acid, maleic anhydride and mixtures thereof. Preferably, the materials to be grafted are selected from the preferred polymeric materials recited above.

The article according to the invention may be produced by any suitable process, e.g. as described in U.S. Pat. No. 9,488,310. The article according to the invention may be produced by a pipe extrusion manufacturing process.

The article according to the invention may be used for the transportation of abrasive solids or slurry solutions by passing the solids or the slurry solutions through the article. The article according to the invention may be used in the field of mining application. Abrasive solids and slurry solutions that are transported through the pipe mainly refer to mineral material, such as ore, sand, coal and coal dust and slurry solutions thereof, which lead to abrasion.

Preferably, the pipe- or tube-shaped article may have an innermost layer, wherein the innermost layer may have a thickness of 0.001 to 100 mm and may comprise a polyolefin composition comprising
  a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
  b) an olefin polymer selected from high-density polyethylene (HDPE).

Preferably, the pipe- or tube-shaped article may have an innermost layer, wherein the innermost layer may have a thickness of 0.001 to 100 mm and may comprise a polyolefin composition comprising
  a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
  b) an olefin polymer selected from high-density polyethylene (HDPE) wherein the HDPE may have a density of 0.940 to 0.970 g/cm$^3$ measured according to ISO1183 and a melt flow rate of 0.03 to 40 g/10 min measured according to ISO1133 at 190 QC and a load of 21.6 kg.

Preferably, the pipe- or tube-shaped article may have an innermost layer, wherein the innermost layer may have a thickness of 0.001 to 100 mm and may comprise a polyolefin composition comprising
  a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
  b) an olefin polymer selected from high-density polyethylene (HDPE) wherein the HDPE may have a density of 0.950 to 0.960 g/cm$^3$ measured according to ISO1183 and a melt flow rate of 1 to 5 g/10 min measured according to ISO1133 at 190° C. and a load of 21.6 kg.

Preferably, the pipe- or tube-shaped article may have an innermost layer, wherein the innermost layer may have a thickness of 0.001 to 100 mm and may comprise a polyolefin composition comprising
  a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
  b) an olefin polymer selected from high-density polyethylene (HDPE) wherein the HDPE may have a density of 0.940 to 0.970 g/cm$^3$ measured according to ISO1183 and a melt flow rate of 0.03 to 40 g/10 min measured according to ISO1133 at 190° C. and a load of 21.6 kg
and wherein the polyolefin composition may have a tensile stress of at least 10 MPa, an elongation at break is at least 430% as measured according to ASTM D638, an abrasion weight loss of the polyolefin composition is at least less than 2% and a Vicat temperature of the polyolefin composition is at least 40° C., preferably at least 44° C. as measured according to ASTM D1525 (10N/50 C/hrs).

Preferably, the pipe- or tube-shaped article may have an innermost layer, wherein the innermost layer may have a thickness of 0.001 to 100 mm and may comprise a polyolefin composition comprising
  a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
  b) an olefin polymer selected from high-density polyethylene (HDPE) wherein the HDPE may have a density of 0.950 to 0.960 g/cm$^3$ measured according to ISO1183 and a melt flow rate of 1 to 5 g/10 min measured according to ISO1133 at 190° C. and a load of 21.6 kg and
and wherein the polyolefin composition may have a tensile stress of at least 10 MPa, an elongation at break is at least 430% as measured according to ASTM D638, an abrasion weight loss of the polyolefin composition is at least less than 2% and a Vicat temperature of the polyolefin composition is at least 40° C., preferably at least 44° C. as measured according to ASTM D1525 (10N/50 C/hrs).

Preferably, the pipe- or tube-shaped article may have an innermost layer, wherein the innermost layer may have a thickness of 0.001 to 100 mm and may comprise a polyolefin composition comprising
  a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
  b) an olefin polymer selected from high-density polyethylene (HDPE) wherein the HDPE may have a density of 0.950 to 0.960 g/cm$^3$ measured according to ISO1183 and a melt flow rate of 1 to 5 g/10 min measured according to ISO1133 at 190° C. and a load of 21.6 kg and
wherein the amount of the propylene-ethylene copolymer a) may be in the range from ≥40 to ≤90 wt %, more preferably from 50 to 90 wt % based on the total amount of the propylene-ethylene copolymer a) and the olefin polymer b).

Preferably, the pipe- or tube-shaped article may have an innermost layer, wherein the innermost layer may have a thickness of 0.001 to 100 mm and may comprise a polyolefin composition comprising
  a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
  b) an olefin polymer selected from high-density polyethylene (HDPE) wherein the HDPE may have a density of 0.950 to 0.960 g/cm$^3$ measured according to ISO1183 and a melt flow rate of 1 to 5 g/10 min measured according to ISO1133 at 190° C. and a load of 21.6 kg and wherein the polyolefin composition may have a tensile stress of at least 10 MPa, an elongation at break is at least 430% as measured according to ASTM D638, an abrasion weight loss of the polyolefin composition is at least less than 2% and a Vicat temperature of the polyolefin composition is at least 40° C., preferably at least 44° C. as measured according to ASTM D1525 (10N/50 C/hrs) and wherein the amount of the propylene-ethylene copolymer a) may be in the range from 40 to 90 wt %, more preferably from 50 to 90 wt % based on the total amount of the propylene-ethylene copolymer a) and the olefin polymer b).

The invention is now elucidated by way of the following examples, without however being limited thereto.

EXAMPLES

1. Test Methods a) Density

The density is measured according to the standards mentioned in table 1.

b) Melt Flow Rate (MFR)

The MFR is measured according the standards mentioned in table 1.

c1) Abrasion Resistance for Part 1

Abrasion resistance is measured according to ISO15527: 2007. For testing round samples with a hole inside and with the dimensions of 4 mm thickness*30 mm outer diameter*8 mm inner diameter are prepared. The tests are performed on a Zhangjiakou Xuanhuakehua testing machine co. ltd., MSH type. The sample plate is rotated at 673 r/min for 7 h. After the test, the samples are cleaned by water and ultrasonic for 30 min, then the sample are dried at 50° C. for 4 h. The weight of the samples before and after testing are recorded.

The weight loss percentage provided is calculated by the formula

Abrasion weight loss=((Sample weight before test−Sample weight after test)/Sample weight before test)*100%.

c2) Abrasion Resistance for Part 2

Abrasion resistance is measured according to ISO15527: 2010. For testing rectangle samples with the dimensions of 76.2*25.4*6.35 mm with two small holes (diameter 10.5 & 4 mm) inside. The tested are performed on a JJFLT equipment produced by JJ TEST. The sample plate is rotated at 1200 r/min for 7 h with the slurry temperature less than 23° C. After the test, the samples are cleaned by water and ultrasonic for 30 min, then the sample are dried at 50° C. for 4 h. The weight of the samples before and after testing are recorded.

The weight loss percentage provided is calculated by the formula

Abrasion weight loss=((Sample weight before test−Sample weight after test)/Sample weight before test)*100%.

d) Tensile Test

Tensile test is measured according to ASTM D638-14 (Standard Test Method for Tensile Properties of Plastics) with a test speed 50 mm/min. Testing bar TYPE I with the dimension: 57.00*13.00*3.18*166 mm is used. For each sample, five bars are tested, the average value is reported.

e) Vicat Temperature

The Vicat temperature is measured according to ASTM D1525, 10N/50 C/hrs.

2. Materials (Part 1 and Part 2)

Table 1 gives an overview of the used materials.

TABLE 1

Overview of used materials and their MFR and density.

| Material | Density, g/cm3 | MFR, g/10 min | Comonomer |
|---|---|---|---|
| Ethylene-octene copolymer SABIC C0560D | 0.863 (ASTM D1505-10) | 0.5 (ASTM D1238 at 190° C. and 2.16 kg) | C8, 39 wt % |
| Propylene-ethylene copolymer Vistamaxx 6102 | 0.862 (ASTM D1505-10) | 1.4 (ASTM D1238 at 190° C. and 2.16 kg) | C2, 16 wt % |
| HDPE SABIC B5403 | 0.954 (ISO 1183) | 2.7 (ISO1133 at 190° C. and 21.6 kg) | |
| LLDPE SABIC 118N | 0.918 (ASTM D1505-10) | 1.0 (ASTM D1238 at 190° C. and 21.6 kg) | |
| PP SABIC 651H | 0.897 (ASTM D1505-10) | 0.25 (ASTM D1238 at 230° C. and 2.16 kg) | |

3. Experiments and Results

Part 1

The components were pre-blended and then melt-mixed and extruded using a twin extruder from Coperion, type ZSK26Mc, according to the settings of Table 2.

TABLE 2

Overview Extruder settings.

| Product | POE/HDPE |
|---|---|
| Zone 1 (° C.) | 20 |
| Zone 2 (° C.) | 60 |
| Zone 3 (° C.) | 120 |
| Zone 4 (° C.) | 200 |
| Zone 5 (° C.) | 200 |
| Zone 6 (° C.) | 200 |
| Zone 7 (° C.) | 200 |
| Zone 8 (° C.) | 230 |
| Zone 9 (° C.) | 230 |
| Zone 10 (° C.) | 230 |
| Die Temp (° C.) | 230 |
| Screw speed (RPM) | 200 |
| Output (kg/hr) | 20 |

Table 3 gives an overview of HDPE compositions and their properties. The wt % HDPE are based the amount of HDPE and the polyolefin elastomer (POE) in the composition. Different compositions of HDPE and propylene-ethylene copolymers (inventive samples) were prepared and compared to compositions of HDPE and ethylene-octene copolymers (comparative examples) with the same wt % of HDPE.

TABLE 3

Overview of Polyolefin elastomer POE and HDPE blends and their properties.

| | | Polyolefin elastomer (POE)/HDPE blends | | | |
|---|---|---|---|---|---|
| | | 10 wt % HDPE | 20 wt % HDPE | 30 wt % HDPE | 40 wt % HDPE |
| Inventive Examples | | | | | |
| Propylene-ethylene copolymer | Abrasion weight loss (%) | 0.71 | 0.25 | 0.09 | 0.10 |
| | Tensile stress (MPa) | 10 | 12 | 14 | 15 |
| | Tensile Elongation (%) | 655 | 755 | 764 | 723 |
| | Vicat temperature (° C.) | 44 | 48 | 48 | 52 |
| Comparative Examples | | | | | |
| Ethylene-octene copolymer | Abrasion weight loss (%) | 0.74 | 0.66 | | 0.39 |
| | Tensile stress (MPa) | | | | 7 |
| | Tensile Elongation (%) | | | | 176 |

The abrasion weight loss of the propylene-ethylene copolymer based compositions is less in comparison to the comparative examples, which are based on the same wt % of HDPE, but which comprise an ethylene-octene copolymer. The weight loss is less for the propylene-ethylene copolymer based compositions, although the MFR of the ethylene-octene copolymer is lower, consequently the ethylene-octene copolymer has a higher molecular weight, which should lead to a better abrasion resistance as known for example from UHMWPE. Furthermore, the tensile stress and the elongation at break are much better for the inventive examples.

Part 2

The components were pre-blended and then melt-mixed and extruded using a twin extruder from Coperion, type ZSK26Mc, according to the settings of Table 4.

TABLE 4

Overview Extruder settings.

| Product | POE/HDPE | POE/LLDPE | POE/PP |
|---|---|---|---|
| Zone 1 (° C.) | 100 | 80 | 80 |
| Zone 2 (° C.) | 180 | 180 | 210 |
| Zone 3 (° C.) | 180 | 180 | 210 |
| Zone 4 (° C.) | 180 | 180 | 210 |
| Zone 5 (° C.) | 180 | 180 | 210 |
| Zone 6 (° C.) | 180 | 180 | 210 |
| Zone 7 (° C.) | 180 | 180 | 210 |
| Zone 8 (° C.) | 180 | 180 | 210 |
| Zone 9 (° C.) | 180 | 180 | 210 |
| Zone 10 (° C.) | 180 | 180 | 210 |
| Die Temp (° C.) | 180 | 180 | 210 |
| Screw speed (RPM) | 300 | 300 | 300 |

TABLE 5

Overview of POE and HDPE, POE and LLDPE, POE and PP blends and their properties.

| | | Polyolefin elastomer (POE)/HDPE blends | | | | | |
|---|---|---|---|---|---|---|---|
| | | 10 wt % HDPE | 20 wt % HDPE | 10 wt % LLDPE | 20 wt % LLDPE | 10 wt % PP | 20 wt % PP |
| Inventive Examples | | | | | | | |
| Propylene-ethylene copolymer | Abrasion weight loss (%) | 0.09 | 0.26 | 0.02 | 0.03 | 0.03 | 0.06 |
| | Tensile stress (MPa) | — | — | 7.4 | 8.6 | 5.7 | 10.8 |
| | Tensile Elongation (%) | — | — | 603 | 603 | 574 | 572 |
| | Vicat temperature (° C.) | 38 | 40 | 38 | 39 | 51 | 62 |
| Comparative Examples | | | | | | | |
| Ethylene-octene copolymer | Abrasion weight loss (%) | 0.09 | 0.16 | 0.11 | 0.09 | 0.11 | 0.1 |
| | Tensile stress (MPa) | — | — | 7.2 | 8.9 | 6.0 | 6.1 |
| | Tensile Elongation (%) | — | — | 456 | 476 | 362 | 214 |
| | Vicat temperature (° C.) | 39 | 46 | 39 | 42 | 48 | 56 |

TABLE 6

Comparative examples - Overview of abrasion weight loss of HDPE, LLDPE and PP.

| Material | Abrasion weight loss (%) |
|---|---|
| 100% HPDE | 2.71 |
| 100% LLDPE | 1.50 |
| 100% PP | 5.17 |

The abrasion weight loss of the propylene-ethylene copolymer based compositions with HDPE, LLDPE and PP is much less in comparison to HDPE, LLDPE and PP as shown in table 5 and 6.

The invention claimed is:

1. A pipe- or tube-shaped article having an innermost layer, wherein the innermost layer has a thickness of 0.001 to 100 mm and comprises a polyolefin composition comprising
    a) a propylene-ethylene copolymer, wherein the amount of repeat units derived from ethylene is 1 to 20 wt % based on the weight of the propylene-ethylene copolymer and wherein the propylene-ethylene copolymer has a density of at most 0.9 g/cm$^3$ as determined by ASTM D1505 and
    b) an olefin polymer selected from high-density polyethylene (HDPE), linear low density polyethylene (LLDPE), polypropylene (PP) and combinations thereof.

2. The article according to claim 1, wherein the amount of the propylene-ethylene copolymer a) is in the range from ≥40 to ≤90 wt % based on the total amount of the propylene-ethylene copolymer a) and the olefin polymer b).

3. The article according to claim 1, wherein the tensile stress of the polyolefin composition is at least 10 MPa and/or the elongation at break is at least 430% as measured according to ASTM D638.

4. The article according to claim 1, wherein the abrasion weight loss of the polyolefin composition is at least less than 2%.

5. The article according to claim 1, wherein the Vicat temperature of the polyolefin composition is at least 40° C. as measured according to ASTM D1525 (10N/50 C/hrs).

6. The article according to claim 1, wherein the amount of repeat units derived from ethylene in the propylene-ethylene copolymer a) is at least 3 wt %, based on the weight of the copolymer.

7. The article according to claim 1, wherein the propylene-ethylene copolymer a) has a density in the range from ≥0.80 g/cm$^3$ to ≤0.90 g/cm$^3$, as determined by ASTM D1505 and/or
    wherein the propylene-ethylene copolymer a) has a MFI of at least ≥1.2 g/10 min and at most ≤21 g/10 min, as determined according to D1238 at 190° C. and a load of 2.16 kg.

8. The article according to claim 1, wherein
    the HDPE has a density of 0.940 to 0.970 g/cm$^3$ measured according to ISO1183 and/or a melt flow rate of 0.03 to 40 g/10 min measured according to ISO1133 at 190° C. and a load of 21.6 kg and/or
    wherein the LLDPE has a density of 0.900 to 0.948 g/cm$^3$ measured according to ASTM D1505 and/or a melt flow rate of 0.03 to 30 g/10 min measured according to ASTM D1238 at 190° C. and a load of 2.16 kg and/or
    wherein the PP has a melt flow rate of 0.01 to 200 g/10 min measured according to ASTM D1238 at 230° C. and a load of 2.16 kg).

9. The article according to claim 1, wherein the article has an outer diameter in the range of 2.5 to 255 cm and/or an inner diameter of 2 to 250 cm and/or wherein the article has one or more layers with a total layer thickness in the range of 0.3 to 100 mm.

10. The article according to claim 1, wherein the total weight of the propylene-ethylene copolymer a) and the olefin polymer b) is at least 90 wt % of the total composition.

11. The article according to claim 1, wherein the article comprises a layer comprising a polyolefin and wherein the layer is adjacent to the innermost layer.

12. The article according to claim 1, wherein the article comprises a layer comprising a high density polyethylene and wherein the layer is adjacent to the innermost layer.

13. A method of making the article according to claim 1, the method comprising extruding the polyolefin composition.

14. A method comprising transporting abrasive solids or slurry solutions by passing the solids or the slurry solutions through the article according to claim 1.

15. The article according to claim 1, wherein the amount of the propylene-ethylene copolymer a) is in the range from ≥50 to ≤90 wt % based on the total amount of the propylene-ethylene copolymer a) and the olefin polymer b).

* * * * *